United States Patent
Nishida

(10) Patent No.: US 11,252,302 B2
(45) Date of Patent: Feb. 15, 2022

(54) IMAGE PROCESSING DEVICE, IMAGE FORMING APPARATUS, IMAGE PROCESSING METHOD, AND NON-TRANSITORY COMPUTER-READABLE STORAGE MEDIUM

(71) Applicant: KYOCERA Document Solutions Inc., Osaka (JP)

(72) Inventor: Atsushi Nishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 49 days.

(21) Appl. No.: 17/006,348

(22) Filed: Aug. 28, 2020

(65) Prior Publication Data

US 2021/0067661 A1   Mar. 4, 2021

(30) Foreign Application Priority Data

Aug. 29, 2019   (JP) .............................. JP2019-157166

(51) Int. Cl.
*H04N 1/407* (2006.01)
*H04N 1/60* (2006.01)
(Continued)

(52) U.S. Cl.
CPC ......... *H04N 1/6027* (2013.01); *G06K 9/6298* (2013.01); *G06N 3/084* (2013.01);
(Continued)

(58) Field of Classification Search
None
See application file for complete search history.

(56) References Cited

U.S. PATENT DOCUMENTS

| 5,181,255 A * | 1/1993 | Bloomberg | G06K 9/00456 382/176 |
| 2012/0308127 A1* | 12/2012 | Kudoh | G06K 9/4652 382/165 |

(Continued)

FOREIGN PATENT DOCUMENTS

| EP | 1 231 558 A2 | 8/2002 |
| JP | 2005-276188 A | 10/2005 |

OTHER PUBLICATIONS

The extended European search report issued by the European Patent Office dated Jan. 27, 2021, which corresponds to European Application No. 20193093.0-1207 and is related to U.S. Appl. No. 17/006,348.

(Continued)

*Primary Examiner* — Dung D Tran
(74) *Attorney, Agent, or Firm* — Studebaker & Brackett PC

(57) ABSTRACT

An image processing device includes: an image classifying section which, through a convolutional neural network, classifies each pixel of input image data as expressing or not expressing a handwritten image to calculate a classification probability of each pixel, the classification probability being a probability that the handwritten image is expressed; a threshold setting section which sets a first threshold when removal processing to remove the handwritten image is performed and a second threshold which is smaller than the first threshold when emphasis processing to emphasize the handwritten image is performed; and an image processor which adjusts a gradation value of pixels with a classification probability no smaller than the first threshold to remove the handwritten image when the removal processing is performed and adjusts the gradation value of pixels with a classification probability no smaller than the second thresh- (Continued)

old to emphasize the handwritten image when the emphasis processing is performed.

5 Claims, 12 Drawing Sheets

(51) Int. Cl.
*G06K 9/62* (2006.01)
*G06N 3/08* (2006.01)
*G06T 11/00* (2006.01)
*G06T 11/60* (2006.01)

(52) U.S. Cl.
CPC ............ *G06T 11/001* (2013.01); *G06T 11/60* (2013.01); *G06T 2207/10024* (2013.01)

(56) References Cited

U.S. PATENT DOCUMENTS

| | | | |
|---|---|---|---|
| 2014/0365949 A1* | 12/2014 | Xia | G06F 3/018 715/780 |
| 2018/0293434 A1* | 10/2018 | Wang | G06K 9/00409 |
| 2019/0089858 A1* | 3/2019 | Pedroza, III | G06F 3/1208 |
| 2020/0349224 A1* | 11/2020 | Kurien | G06N 3/0454 |
| 2021/0258447 A1* | 8/2021 | Nishida | G06K 9/4604 |

OTHER PUBLICATIONS

Junho Jo et al.,"Handwritten Text Segmentation via End-to-End Learning of Convolutional Neural Networks", Jun. 12, 2019, https://arxiv.org/pdf/1906.05229.pdf, total 6 pages, XP055765124.

\* cited by examiner

Fully connected layers (refer to FIG. 5)

k − 1 layer      k layer

Output layer (refer to FIG. 9)

Class probability

1st variation

2nd variation

IMAGE PROCESSING DEVICE, IMAGE FORMING APPARATUS, IMAGE PROCESSING METHOD, AND NON-TRANSITORY COMPUTER-READABLE STORAGE MEDIUM

INCORPORATION BY REFERENCE

The present application claims priority under 35 U.S.C. § 119 to Japanese Patent Application No. 2019-157166, filed on Aug. 29, 2019. The contents of this application are incorporated herein by reference in their entirety.

BACKGROUND

The present disclosure relates to an image processing device, an image forming apparatus, an image processing method, and a non-transitory computer-readable storage medium, specifically to copying and reading an image of printed matter in which a character is written by hand.

When printed matter is distributed at an academic conference or seminar for example, a portion of lecture content may be supplemented with handwriting in the printed matter. In this case, printed matter in which the handwriting has been removed may be desired later. Such handwriting is not strictly limited to a color with a hue differing from a toner color of the printed matter, and may often be written with a coloring material of a visually similar color such as black ball-point pen or pencil. To address this problem, an existing image processing device uses expansion processing to blur the entire image including handwritten characters, uses dark portion extraction processing to erase thin portions of the handwritten characters in the image obtained through the expansion processing, uses small area removal processing to erase the few remaining parts of handwriting in the image obtained through the dark portion extraction processing, and performs sum calculation processing on the document image and the image obtained through the small area removal processing, thereby producing clean printed character portions.

SUMMARY

An image processing device according to an aspect of the present disclosure includes an image classifying section, a threshold setting section, and an image processor. Through a convolutional neural network, the image classifying section classifies each pixel of input image data as expressing or not expressing a handwritten image and calculates a classification probability of each pixel. The classification probability is a probability that the handwritten image is expressed. The threshold setting section sets a first threshold when removal processing is performed and a second threshold when emphasis processing is performed. The removal processing is image processing to remove the handwritten image. The emphasis processing is image processing to emphasize the handwritten image. The second threshold is smaller than the first threshold. The image processor adjusts a gradation value of pixels for which the classification probability is no smaller than the first threshold to remove the handwritten image when the removal processing is performed and adjusts the gradation value of pixels for which the classification probability is no smaller than the second threshold to emphasize the handwritten image when the emphasis processing is performed.

An image forming apparatus according to an aspect of the present disclosure includes the above image processing device, an image forming section, and a color conversion processor. The image forming section forms an image with a prescribed coloring material on an image formation medium. The color conversion processor converts a color space of the input image data into a color space which is reproducible with the prescribed coloring material. The image classifying section performs the classification and calculation of the classification probability based on the image data converted into the color space which is reproducible with the prescribed coloring material.

An image processing method according to an aspect of the present disclosure includes: classifying each pixel of input image data as expressing or not expressing a handwritten image and calculating a classification probability of each pixel using a convolutional neural network, the classification probability being a probability that the handwritten image is expressed; setting a first threshold when removal processing is performed and a second threshold when emphasis processing is performed, the removal processing being image processing to remove the handwritten image, the emphasis processing being image processing to emphasize the handwritten image, the second threshold being smaller than the first threshold; and adjusting a gradation value of pixels for which the classification probability is no smaller than the first threshold to remove the handwritten image when the removal processing is performed and adjusting the gradation value of pixels for which the classification probability is no smaller than the second threshold to emphasize the handwritten image when the emphasis processing is performed.

The present disclosure provides a non-transitory computer-readable storage medium which stores an image processing program for controlling an image processing device. The image processing program causes the image processing device to function as: an image classifying section which, through a convolutional neural network, classifies each pixel of input image data as expressing or not expressing a handwritten image and calculates a classification probability of each pixel, the classification probability being a probability that the handwritten image is expressed; a threshold setting section which sets a first threshold when removal processing is performed and a second threshold when emphasis processing is performed, the removal processing being image processing to remove the handwritten image, the emphasis processing being image processing to emphasize the handwritten image, the second threshold being smaller than the first threshold; and an image processor which adjusts a gradation value of pixels for which the classification probability is no smaller than the first threshold to remove the handwritten image when the removal processing is performed and adjusts the gradation value of pixels for which the classification probability is no smaller than the second threshold to emphasize the handwritten image when the emphasis processing is performed.

DETAILED DESCRIPTION

The following describes an embodiment of the present disclosure with reference to the accompanying drawings.

Figure 1:
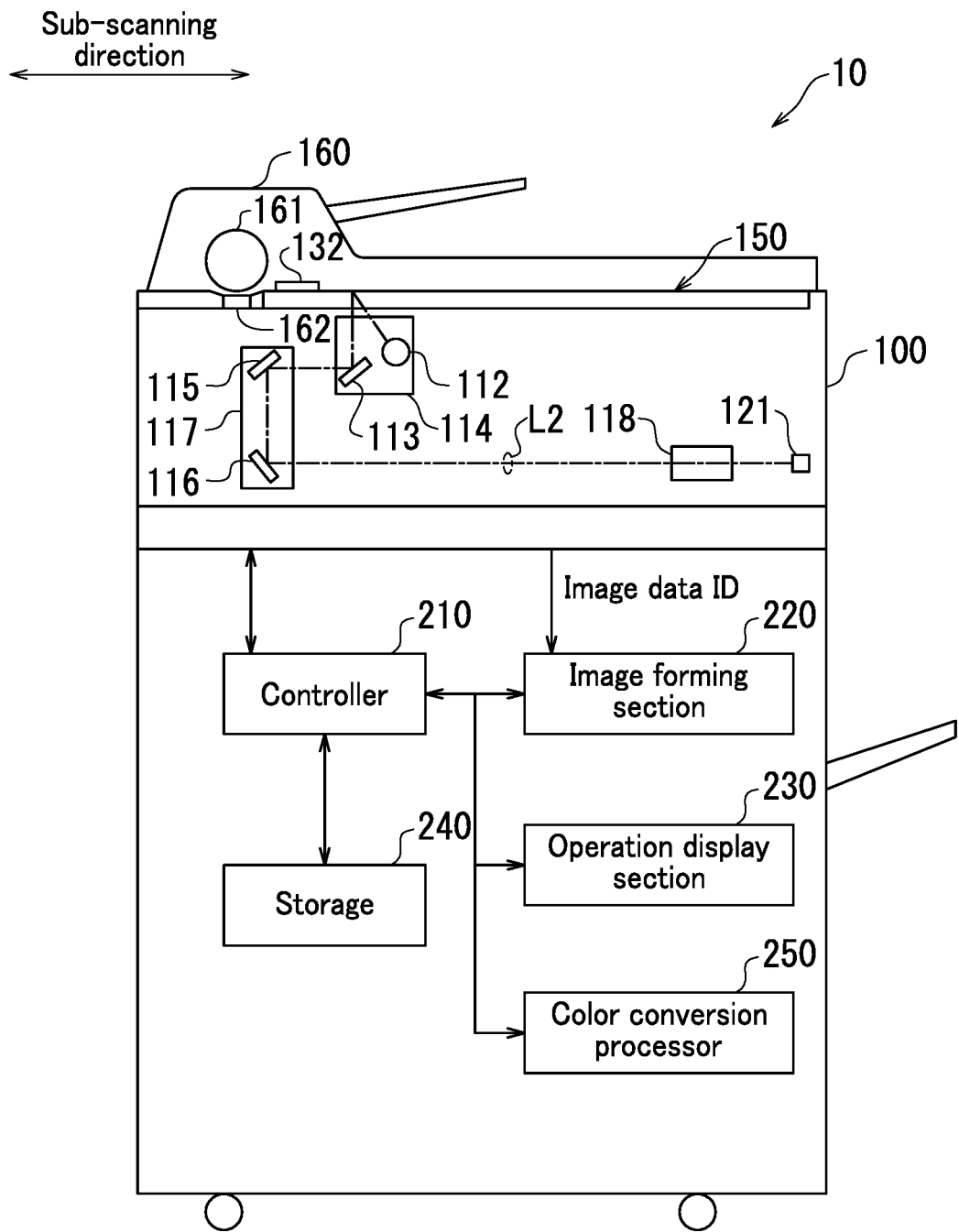
FIG. 1 is a general configuration diagram illustrating an overall configuration of an image forming apparatus according to an embodiment of the present disclosure.
Figure 2:
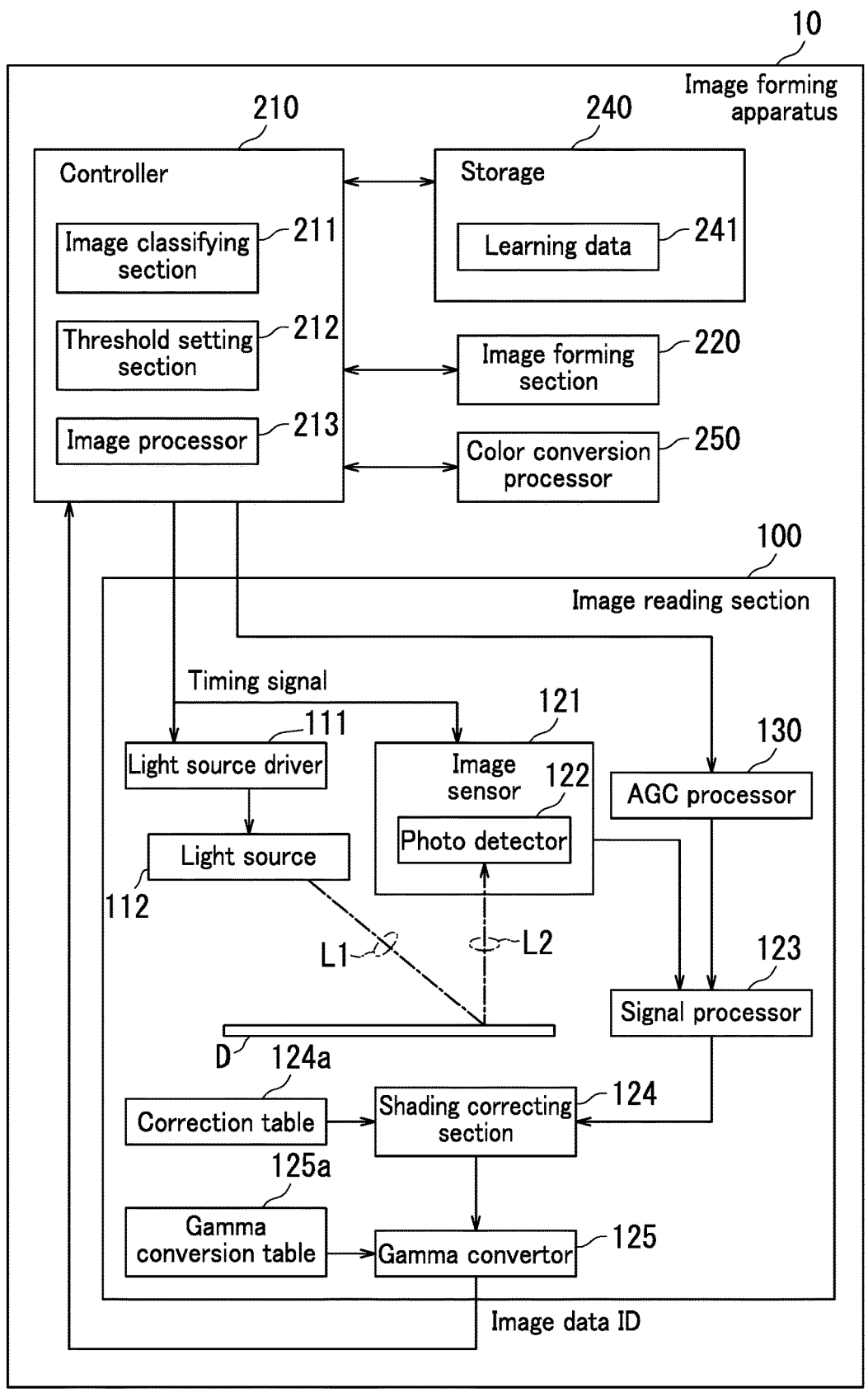
FIG. 2 is a block diagram illustrating a functional configuration of the image forming apparatus of the embodiment.

FIG. 1 is a general configuration diagram illustrating an overall configuration of an image forming apparatus 10 according to the embodiment of the present disclosure. FIG. 2 is a block diagram illustrating a functional configuration of the image forming apparatus 10 of the embodiment. The image forming apparatus 10 includes a controller 210, an image forming section 220, an operation display section 230, storage 240, a color conversion processor 250, and an image reading section 100. The image reading section 100 includes an automatic document feeder (ADF) 160 and a document table (contact glass) 150, and reads an image (document image) from a document to generate image data ID which is digital data.

The image forming section 220 forms an image on a printing medium (unillustrated) based on the image data ID and ejects the printing medium. The operation display section 230 receives operation input of a user (also referred to simply as user input) from a display functioning as a touch panel (unillustrated) or various buttons or switches (unillustrated).

The controller 210 includes a main storage means such as random-access memory (RAM) or read-only memory (ROM) and a control means such as a microprocessing unit (MPU) or a central processing unit (CPU). The controller 210 also has an image classifying section 211, a threshold setting section 212, and an image processor 213, includes controller functions related to interfacing with various input/output (I/O), Universal Serial Bus (USB), bus, and other hardware, and performs overall control of the image forming apparatus 10. The controller 210 functions as an image processing device, for example.

The storage 240 is a storage device consisting of elements such as a hard disk drive or flash memory as a storage medium and stores data or processing control programs (image processing programs, for example) to be executed by the controller 210. Learning data 241 is stored in the storage 240.

The color conversion processor 250 converts a color space of the image data ID into a color space which is reproducible in colors of the coloring material used by the image forming section 220.

As illustrated in FIG. 2, the image reading section 100 includes a light source driver 111 and a light source 112. The light source 112 has a plurality of light-emitting diodes (LED, unillustrated) which radiate light to a document D. The light source driver 111 is an LED driver which drives the LEDs arranged in a main scanning direction and performs on and off drive control of the light source 112. Therefore, the light source 112 can radiate radiated light L1 to the document surface of the document D through pulse width modulation (PWM) with a variable drive duty.

The radiated light L1 is radiated at a 45 degree (diagonal) angle to a direction perpendicular to the surface of the document D. The document D reflects reflected light including diffuse reflected light L2 and specular reflected light. Photo detectors 122 receive the diffuse reflected light L2. The diffuse reflected light L2 is light of a spectrum corresponding to absorption properties of a coloring material. Specifically, the diffuse reflected light L2 of a printed image is light of a spectrum corresponding to absorption properties of a coloring material used in printing, and the diffuse reflected light L2 of a handwritten image is light of a spectrum corresponding to absorption properties of coloring materials such as ink or graphite used in writing tools.

As illustrated in FIG. 1, the image reading section 100 further includes a first reflector 113, a first carriage 114, a second reflector 115, a third reflector 116, a second carriage 117, and a condensing lens 118 between the document D and an image sensor 121. The first reflector 113 reflects the diffuse reflected light L2 from the document D in the direction of the second reflector 115. The second reflector 115 reflects the diffuse reflected light L2 in the direction of the third reflector 116. The third reflector 116 reflects the diffuse reflected light L2 in the direction of the condensing lens 118. The condensing lens 118 forms an image with the diffuse reflected light L2 on each light receiving surface (unillustrated) of the photo detectors 122 in the image sensor 121.

The image sensor 121 includes three charge-coupled device (CCD) line sensors (unillustrated) which respectively detect the three colors red, green, and blue (RGB) used in a color filter (unillustrated) with RGB color components. The image sensor 121 scans (sub-scans) the document D using the three CCD line sensors extending in the main scanning direction to combine and acquire voltage values corresponding to RGB in the image on the document D. As such, the image sensor 121 can output RGB analog electric signals of each pixel in the main scanning direction by performing photoelectric conversion processing.

The first carriage 114 carries the light source 112 and the first reflector 113 and reciprocates in the sub-scanning direction. The second carriage 117 carries the second reflector 115 and the third reflector 116 and reciprocates in the sub-scanning direction. The first carriage 114 and the second carriage 117 are controlled by the controller 210 functioning as a scan controller. Therefore, because the light source 112 can scan the document D in the sub-scanning direction, the image sensor 121 can output an analog electric signal corresponding to a two-dimensional image on the document D.

It should be noted that when the ADF 160 is used, the first carriage 114 and the second carriage 117 are fixed in a preset sub-scanning position and scanning is performed in the sub-scanning direction by automatically feeding the document D. The ADF 160 may not read only one side of the document D but both sides of the document D simultaneously or sequentially.

The ADF 160 includes a feeding roller 161 and a document reading slit 162. The feeding roller 161 performs automatic feeding of the document D and allows the document D to be read through the document reading slit 162. In this case, the light source 112 carried by the first carriage 114 is also fixed in a prescribed position because the first carriage 114 is fixed in the preset sub-scanning position.

As illustrated in FIG. 2, the image reading section 100 further includes a signal processor 123, a shading correcting section 124, a shading correction table 124a, a gamma convertor 125, a gamma conversion table 125a, an automatic gain control (AGC) processor 130, and a white reference plate 132 (refer to FIG. 1).

The signal processor 123 is a variable gain amplifier with an analog/digital (A/D) conversion function. The signal processor 123 amplifies the analog electric signal and converts the amplified analog electric signal into digital data through A/D conversion. The gain by which the analog electric signal is amplified is set by the AGC processor 130 and stored in the storage 240. The gamma convertor 125 and the gamma conversion table 125a are described later.

In the present embodiment, the AGC processor 130 is a gain adjustor which sets optimal gain and offset values to the photo detectors 122 using a black reference signal and a white reference signal. The black reference signal is the analog electric signal of a photo detector 122 in a state where the light source 112 is off. The white reference signal is the analog electric signal of a photo detector 122 when light is radiated to the white reference plate 132 instead of the document D.

The AGC processor 130 sets the offset values such that each RGB gradation value in the image data ID is a minimum value of "0" when the signal processor 123 converts the black reference signal through A/D conversion. The AGC processor 130 sets the gain such that each RGB gradation value in the image data ID is a maximum value of "255" when the signal processor 123 converts the white reference signal through A/D conversion using the offset values. Therefore, a dynamic range from the minimum value of "0" to the maximum value of "255" can be effectively used.

The shading correcting section 124 performs shading correction on the digital data to generate the image data ID. Shading correction is correction for inhibiting shading caused by vignetting due to non-uniformity in an amount of light in the long direction of the light source 112 or the cosine fourth law of the lens and by uneven sensitivity of the photo detectors 122 arranged in the main scanning direction. Shading correction values are used in the shading correction. The shading correction values are generated using the white reference plate 132 and are stored in the shading correction table 124a.

As such, the image reading section 100 generates the image data ID by reading an image on the document D. The image data ID is RGB image data expressing the image on the document D in each RGB gradation value (0 to 255).

The RGB image data is data based on the light of a spectrum corresponding to the absorption properties of a coloring material used for printing a printed image, and is for generating light of a spectrum corresponding to the absorption properties of coloring materials used in writing tools such as ink and graphite in a handwritten image. Furthermore, a handwritten image has shapes and densities with features caused by movement of a human hand, and the features caused by the movement of the human hand may also be reproduced in the RGB image data.

Figure 3:
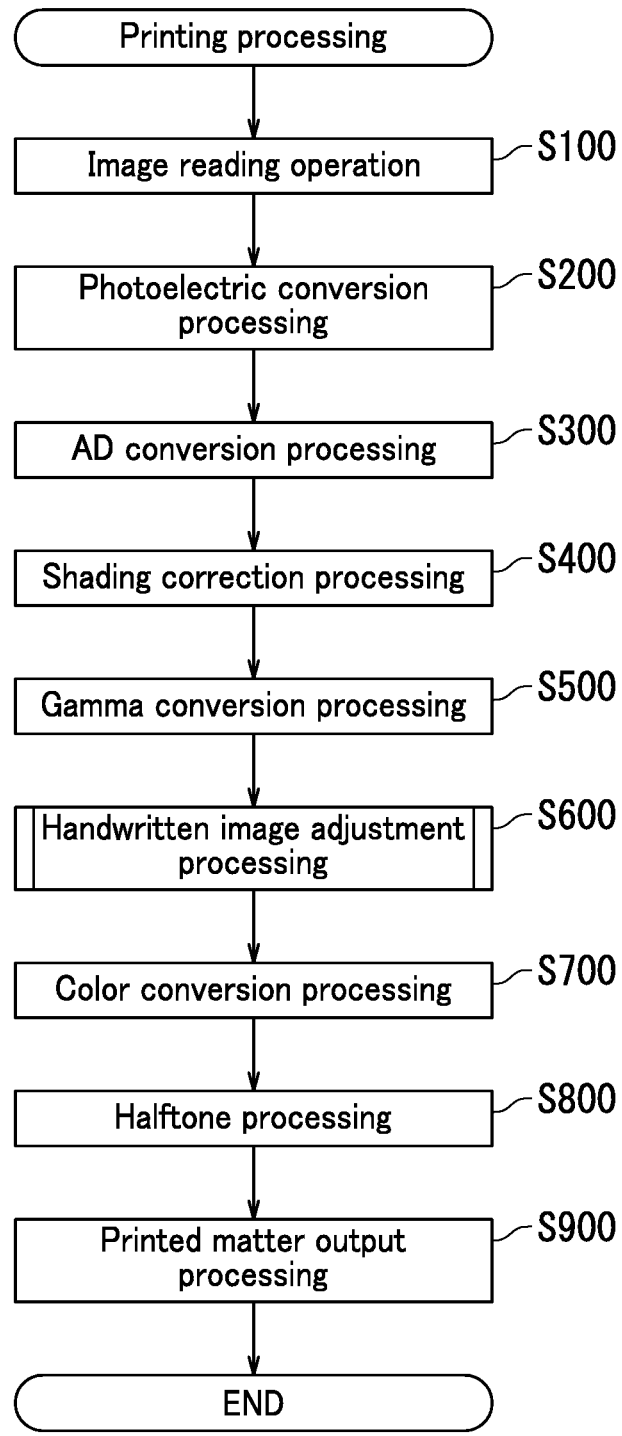
FIG. 3 is a flowchart depicting the content of printing processing in the embodiment.

FIG. 3 is a flowchart depicting the content of printing processing in the embodiment. In Step S100, the user performs an image reading operation. In the image reading operation, the image reading section 100 provides the document D with the radiated light L1 of a light quantity optimized by PWM with a variable drive duty from the light source 112 and receives through the image sensor 121 the diffuse reflected light L2 reflected by the document D with color components according to an image expressed by the document D.

In Step S200, the image sensor 121 can output RGB analog electric signals for each pixel in the main scanning direction by performing photoelectric conversion processing.

In Step S300, the signal processor 123 can output RGB gradation values within a range from the minimum value "0" (state where the light source 112 is off) to a maximum value "255" (when reading the white reference plate 132) by using gains and output values set by the AGC processor 130. In Step S400, the shading correcting section 124 performs shading correction on the digital data to generate the image data ID.

In Step S500, the gamma convertor 125 (refer to FIG. 2) performs gamma conversion based on the properties of the image reading section 100. Values read out from the gamma conversion table 125a are used in the gamma conversion. The gamma conversion table 125a can recursively set and calculate gamma values using RGB values (after γ conversion) calculated from measured color values of a gray patch on the document D in a desired color space (sRGB for example). Thereby, the image data ID is generated.

Figure 4:
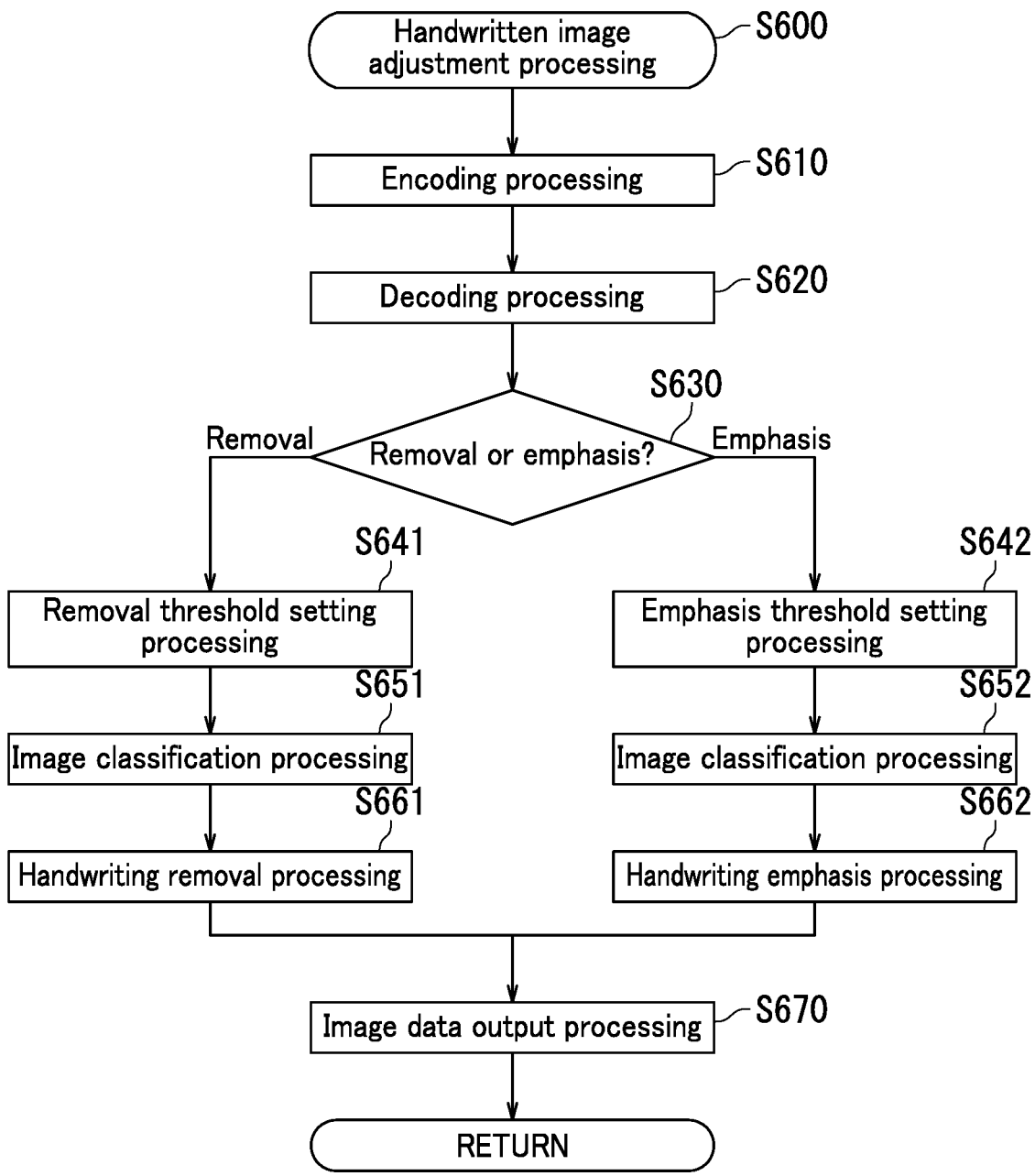
FIG. 4 is a flowchart depicting the content of handwritten image adjustment processing in the embodiment.

FIG. 4 is a flowchart depicting the content of handwritten image adjustment processing (Step S600) in the embodiment. The handwritten image adjustment processing includes handwritten image removal processing and handwritten image emphasis processing. The handwritten image removal processing is processing in which a handwritten image is automatically selected and removed. The handwritten image emphasis processing is processing in which a handwritten image is automatically selected and emphasized to facilitate viewing. In this example, it is assumed that the user selects either handwritten image removal processing or handwritten image emphasis processing in advance to perform the handwritten image adjustment processing. The handwritten image removal processing is also simply referred to as removal processing. The handwritten image emphasis processing is also simply referred to as emphasis processing.

In Step S610, the image classifying section 211 performs encoding processing. In the encoding processing, the image classifying section 211 uses a convolutional neural network (CNN) to calculate a class probability for performing classification (image segmentation) of the handwritten images and printing images.

Figure 5:
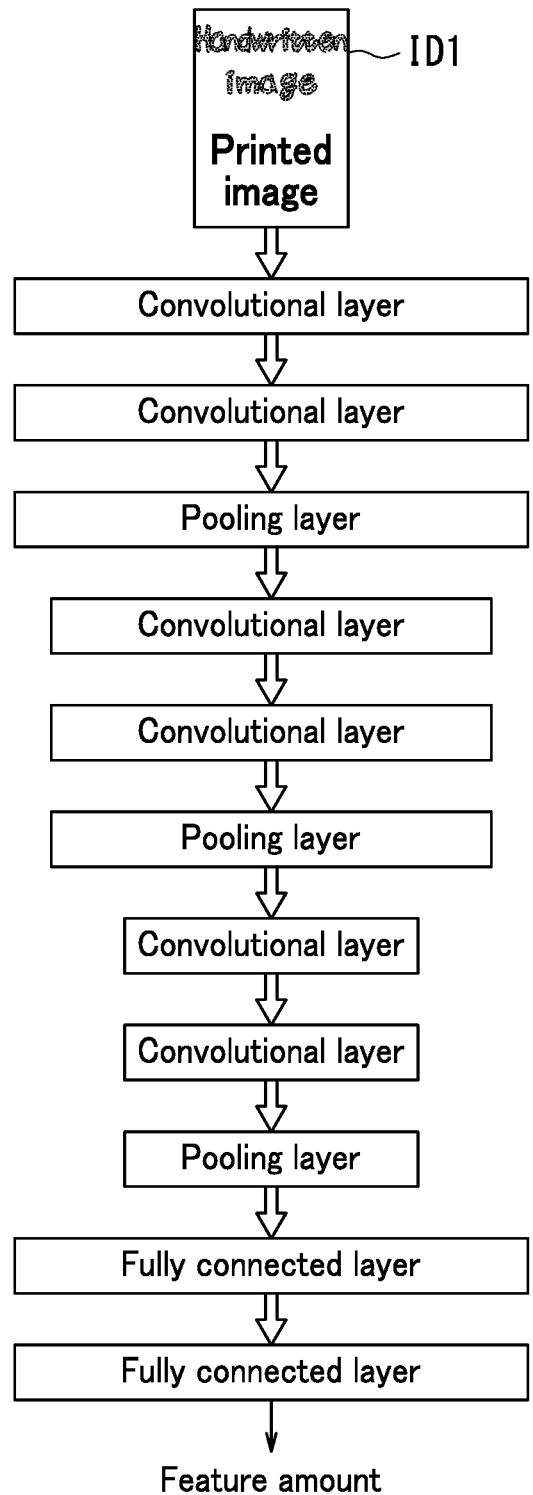
FIG. 5 is a descriptive diagram illustrating an example of encoding processing in the embodiment.

FIG. 5 is a descriptive diagram illustrating an example of the encoding processing in the embodiment. The CNN is a neural network which includes convolutional layers, pooling layers, and fully connected layers. The convolutional layers are layers in which convolution is performed. The pooling layers are layers in which pooling processing is performed.

Figure 6:
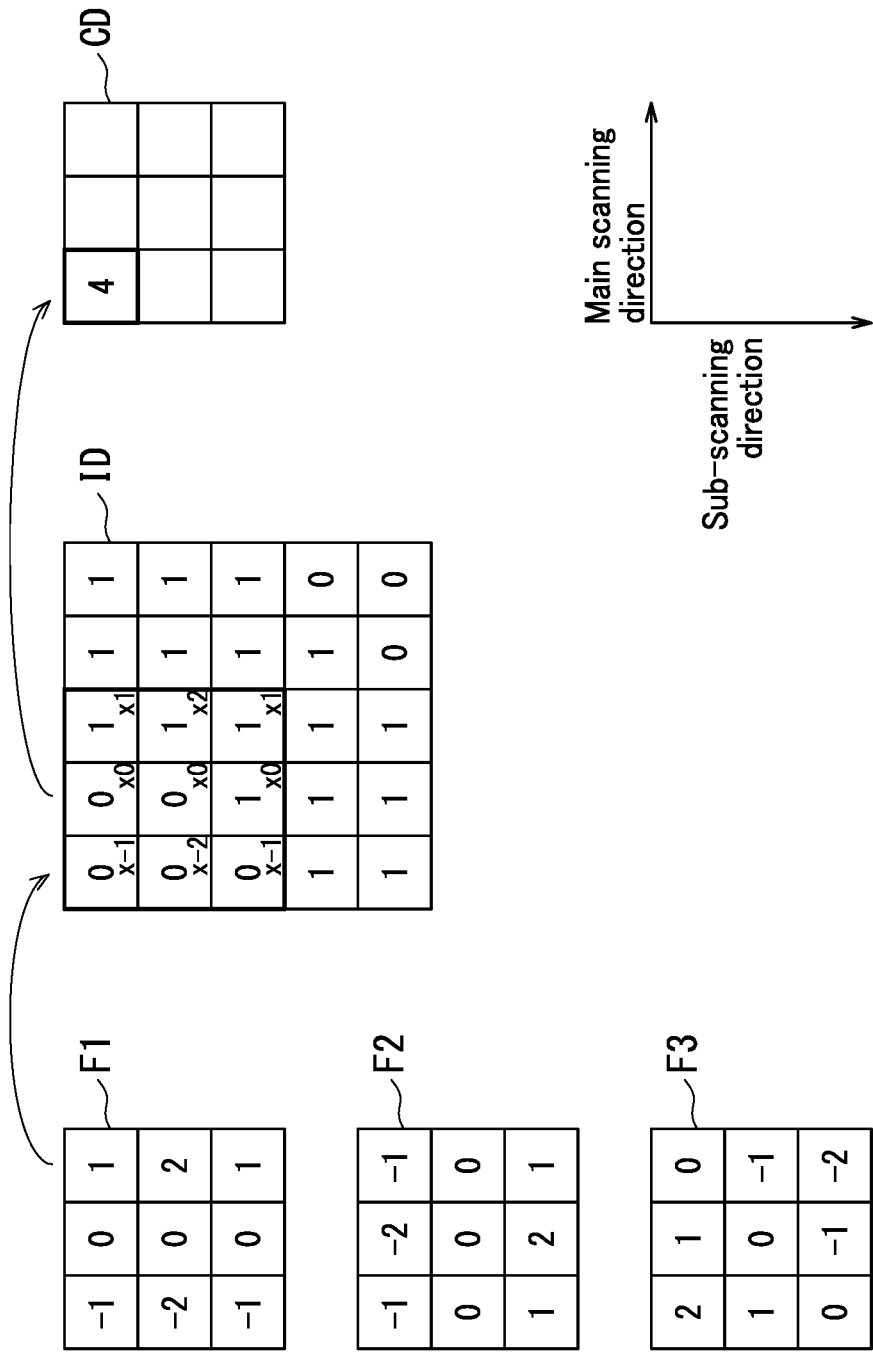
FIG. 6 is a descriptive diagram illustrating an example of convolution in the embodiment.

FIG. 6 is a descriptive diagram illustrating an example of convolution in the embodiment. In convolution, the image classifying section 211 extracts edges by convolving a plurality of filters, for example differential filters F1 to F3, for all positions of each piece of RGB data in the image data ID. Therefore, the image classifying section 211 can generate convolution data CD expressing a feature map including edge information.

The weight of a differential filter can be adjusted or determined by learning. Learning can be implemented as supervised learning by using handwritten images and printed images as teacher (training) data in an error back-propagation method, for example. A learning result of the learning is stored in the storage 240 as learning data 241. Therefore, it is possible to improve classification accuracy in advance by using handwritten images made with various writing tools and using general human handwriting information or differences in absorption properties between coloring materials.

Figure 7:
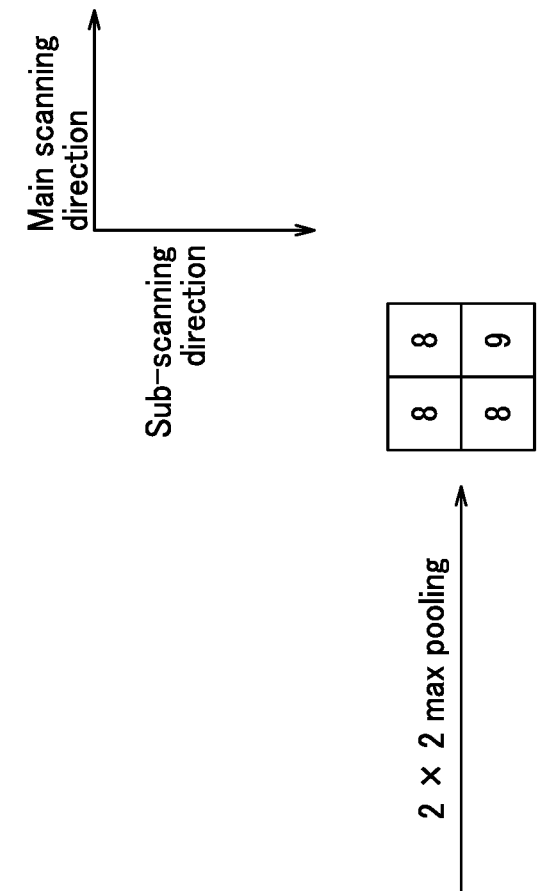
FIG. 7 is a descriptive diagram illustrating an example of pooling processing in the embodiment.

FIG. 7 is a descriptive diagram illustrating an example of pooling processing in the embodiment. In pooling processing, the image classifying section 211 reduces the size of the feature map, that is, discards positional information, to enable global processing. However, the image classifying section 211 separately saves position information which is positional information for use in decoding processing (later described).

As such, the image classifying section 211 can combine low-order information locally in the convolutional layers and the pooling layers to extract high-order information more globally. That is, the image classifying section 211 can sequentially convert the image data ID from pixel information to edge information and from edge information to handwriting information.

Figure 8A:
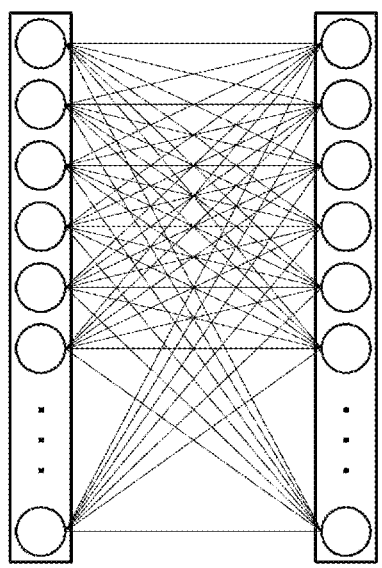
FIGS. 8A and 8B are descriptive diagrams illustrating examples of fully connected layers and an output layer in the embodiment.
Figure 8B:
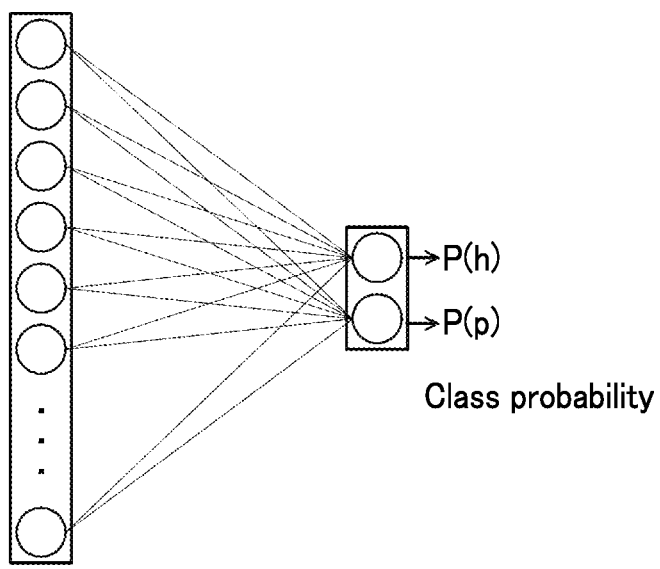

FIGS. 8A and 8B are descriptive diagrams illustrating examples of fully connected layers and an output layer in the embodiment. FIG. 8A illustrates the fully connected layers. The fully connected layers are layers in which all nodes in one layer are connected to all nodes in a subsequent layer. The fully connected layers generate a handwriting feature quantity and a printing feature quantity which are feature quantities used to collect output from the pooling layers and classify images.

It should be noted that the fully connected layers are not essential configuration, and the CNN may be configured to use a fully convolutional network (FCN) which uses convolutional layers with a specific configuration instead of the fully connected layers.

In Step S620, the image classifying section 211 performs decoding processing. In the decoding processing, the image classifying section 211 reflects a classification (image segmentation) of handwritten images and printed images for each pixel using a CNN. Therefore, the image classifying section 211 can classify image areas at pixel level.

Figure 9:
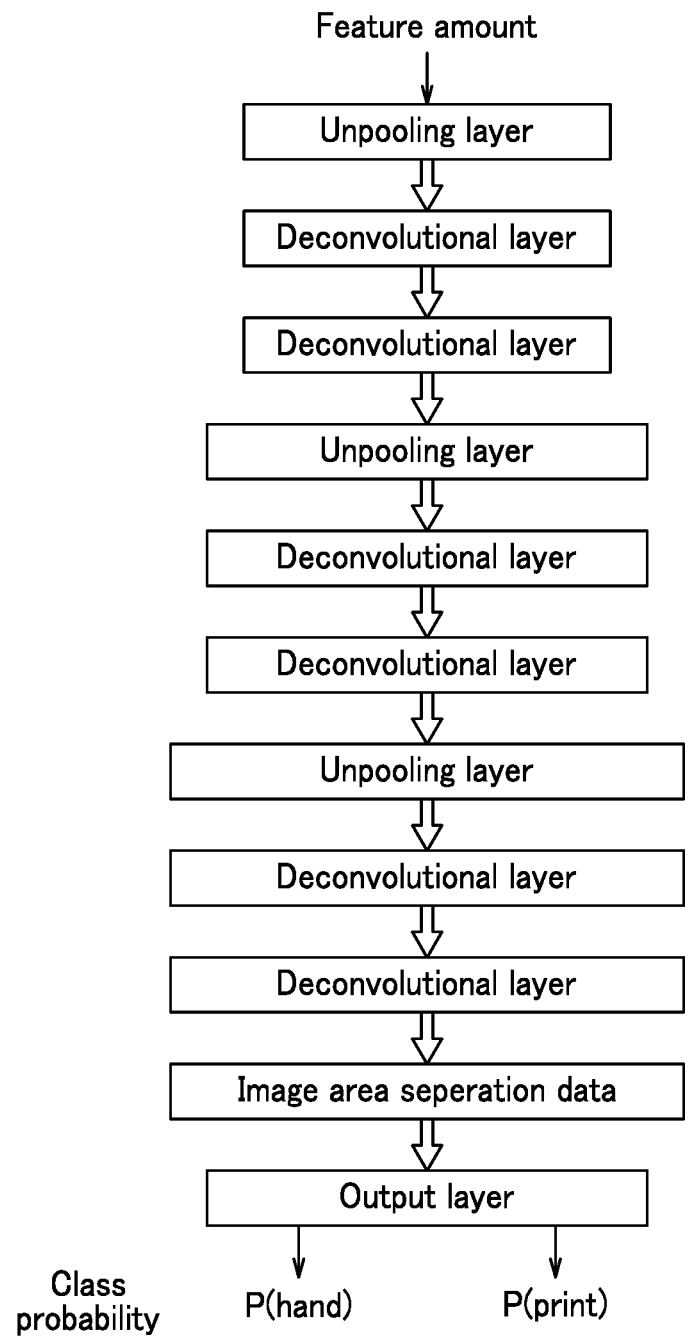
FIG. 9 is a descriptive diagram illustrating an example of decoding processing in the embodiment.

FIG. 9 is a descriptive diagram illustrating an example of decoding processing in the embodiment. Decoding processing is processing through which the image classifying section 211 uses unpooling layers and deconvolutional layers to perform up-sampling of the handwriting feature quantity and the printing feature quantity and specify a handwriting probability P(h) and a printing probability P(p) for each pixel in the image data ID.

In the unpooling layers, the image classifying section 211 reproduces an accurate classification map using position information stored in the pooling processing. The classification map is a map in which the handwriting feature quantity and the printing feature quantity are stored. In the deconvolutional layers, the image classifying section 211 can specify the handwriting feature quantity and the printing feature quantity for each pixel of the image data ID by converting the handwriting feature quantity and the printing feature quantity into pixel information which has the handwriting feature quantity and the printing feature quantity.

In the output layer (refer to FIG. 8B), the image classifying section 211 normalizes the handwriting feature quantity and the printing feature quantity for each pixel through a softmax function and outputs the handwriting probability P(h) which is a classification probability of a handwritten image and the printing probability P(p) which is a classification probability of a printed image. The handwriting probability P(h) and the printing probability P(p) take values from 0 to 1.0, and the sum thereof is 1.0.

Therefore, the image classifying section 211 can implement semantic image segmentation processing to generate image area classification data. It may be said that the image area classification data is data in which each pixel of the image data ID is labeled with the handwriting probability P(h) and the printing probability P(p).

An open source SegNet may be used for example as a CNN capable of implementing semantic image segmentation processing. SegNet is an image classification method offered by the University of Cambridge which uses deep learning, and may divide an image of a traffic scene, for example, according to pixel unit.

In Step S630, the image classifying section 211 selects either the removal method or the emphasis method. In this example, it is assumed that the user selects either handwritten image removal processing or handwritten image emphasis processing in advance to place a flag. The image classifying section 211 selects either the removal method or the emphasis method based on the flag. In this example, it is assumed that the handwriting removal method is selected first.

Figure 10A:
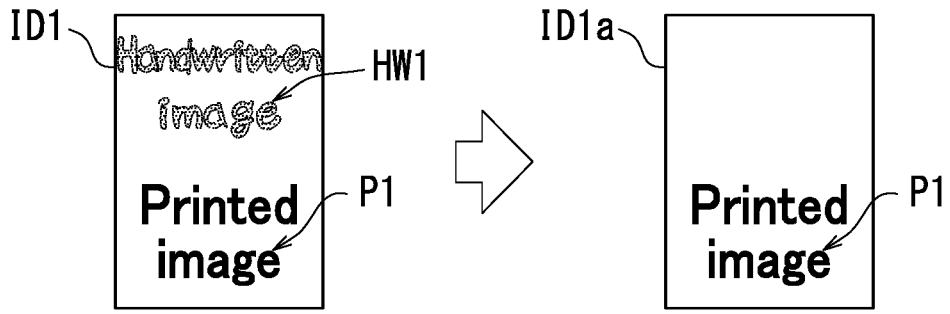
FIGS. 10A and 10B are descriptive diagrams illustrating examples of removal processing and emphasis processing in the embodiment.
Figure 10B:
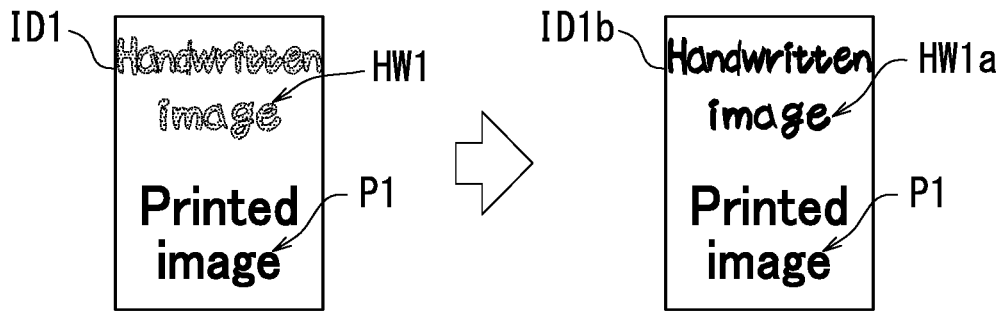

FIGS. 10A and 10B are descriptive diagrams illustrating examples of the removal processing and the emphasis processing in the embodiment. FIG. 10A illustrates the removal processing in the embodiment. Input image data ID1 to undergo the removal processing includes a handwritten image HW1 and a printed image P1. The handwritten image HW1 expresses text (characters) of "handwritten image", and the printed image P1 expresses text (characters) of "printed image". In this example, the handwriting probability P(h) of each pixel expressing the handwritten image HW1 is distributed within a range of 0.93 to 0.95. The printing probability P(p) of each pixel expressing the handwritten image HW1 is distributed within a range of 0.05 to 0.07.

In Step S641, the threshold setting section 212 performs removal threshold setting processing. In the removal threshold setting processing, the threshold setting section 212 sets a removal threshold for determining whether or not an image is a handwritten image as a prerequisite for the removal processing. The removal threshold is also referred to as a first threshold, and may for example be statistically adjusted or determined based on a user setting. In this example, the threshold setting section 212 is assumed to have set 0.9 (90%) as the removal threshold.

In Step S651, the image classifying section 211 performs image classification processing. In the image classification processing, the image classifying section 211 classifies images by each pixel based on the handwriting probability P(h) of each pixel in the image data ID. Specifically, the image classifying section 211 classifies pixels with a handwriting probability P(h) of 0.9 or greater as the removal threshold as handwritten images and determines (classifies) other pixels to be printed images or the background color of the printing medium. In this example, the image classifying section 211 determines that all pixels expressing the handwritten image HW1 express a handwritten image.

In Step S661, the image processor 213 performs handwriting removal processing. In the handwriting removal processing, the image processor 213 adjusts a gradation value of each pixel expressing the handwritten image HW1 such that the color of all pixels classified as a handwritten image becomes the background color (white, for example).

Therefore, the handwritten image HW1 is removed and the image processor 213 can generate output image data ID1a expressing only the printed image P1. Next, it is assumed that the emphasis processing is selected.

FIG. 10B illustrates the emphasis processing in the embodiment. The input image data ID1 which undergoes emphasis processing is the same image data as the input image data ID1 which undergoes removal processing.

In Step S642, the threshold setting section 212 performs emphasis threshold setting processing. In the emphasis threshold setting processing, the threshold setting section 212 sets an emphasis threshold for determining whether or not an image is a handwritten image as a prerequisite for the emphasis processing. The emphasis threshold is also referred to as a second threshold, and may for example be statistically adjusted or determined based on a user setting. In this example, the threshold setting section 212 is assumed to have set 0.7 (70%) as the emphasis threshold.

In Step S652, the image classifying section 211 performs image classification processing. The image classifying section 211 classifies pixels with a handwriting probability P(h) of 0.7 or greater as a handwritten image, and determines other pixels to be a printed image or the background color of the printing medium. Here, 0.7 is the emphasis threshold. In this example, the image classifying section 211 determines that all pixels expressing the handwritten image HW1 express a handwritten image, and that all other pixels express other types of images (printed image or background).

In Step S662, the image processor 213 performs handwriting emphasis processing. In the handwriting emphasis processing, the image processor 213 adjusts a gradation value of each pixel expressing the handwritten image HW1 such that the color of all pixels classified as a handwritten image darken to become distinct. Therefore, the image processor 213 can generate output image data ID1b including an emphasized handwritten image HW1a and the printed image P1.

Figure 11A:
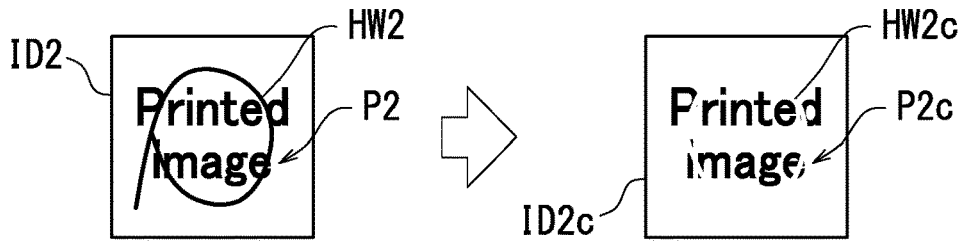
FIGS. 11A to 11C are descriptive diagrams illustrating a comparative example and examples of processing in the embodiment.
Figure 11B:
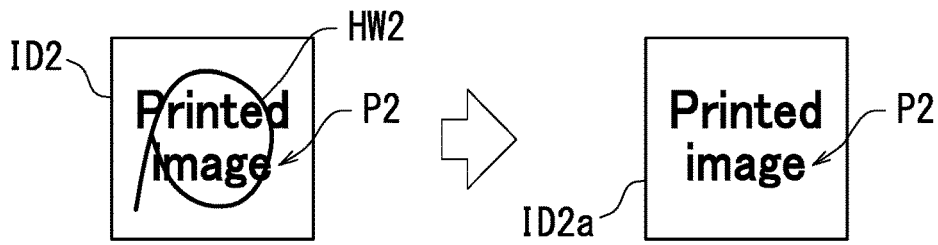
Figure 11C:
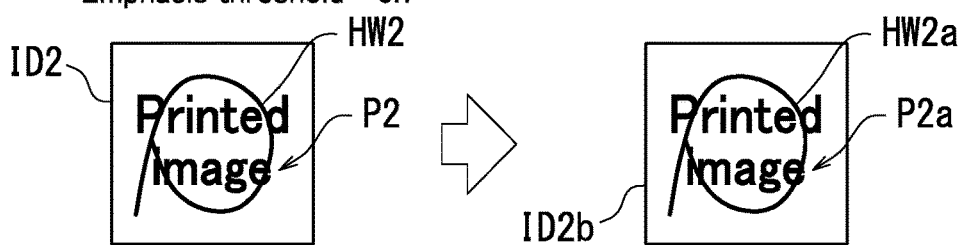

FIGS. 11A to 11C are descriptive diagrams illustrating a comparative example and examples of processing in the embodiment. FIG. 11A illustrates removal processing according to a comparative example. The removal processing in the comparative example differs from the removal processing in the embodiment in that a common threshold of 0.8 is used. Input image data ID2 which undergoes removal processing includes a printed image P2 which is a printed image expressing text of "printed image" and a handwritten image HW2 which is a handwritten image expressing a handwritten circle over the text of "printed image".

In this example, the handwriting probability P(h) of each pixel expressing the handwritten image HW2 is distributed within a range of 0.83 to 0.93. The printing probability P(p) of each pixel expressing the handwritten image HW2 is distributed within a range of 0.07 to 0.17. In this example, it is assumed that the color of the coloring material forming the handwritten image HW2 is close to the color of the coloring material of a printed image and an area exists in which the printed image P2 and the handwritten image HW2 overlap and the printed image P2 is visible through the handwritten image HW2.

In this example, the handwriting probability P(h) is generally lowered compared to the examples in FIGS. 10A and 10B because the color of the coloring material forming the handwritten image HW2 is close to the color of the coloring material of the printed image P2. Additionally, the handwriting probability P(h) is lowered to a minimum value of 0.83 because an area exists in which the printed image P2 and the handwritten image HW2 overlap and the printed image P2 is visible through the handwritten image HW2.

In this example, the removal processing in the comparative example is for determining that all pixels expressing the handwritten image HW1, including pixels overlapping with pixels expressing the printed image P2, express a handwritten image, and that all pixels expressing the printed image P2 other than the pixels overlapping with the handwritten image HW1 express other types of images (printed images and background). Therefore, there is concern that the removal processing in the comparative example will generate image data ID2c including a printed image P2c in which a portion of the printed image P2 (overlapping portion image HW2c) has been omitted.

The present inventor has noted that this problem occurs due to a tradeoff between misdetection and non-detection of a handwritten image. That is, this tradeoff is a non-detection problem wherein misdetection in which images that are not handwritten images are recognized as handwritten images decreases if the threshold is great but handwritten images escape detection. The present inventor has noted this problem and devised a new method of changing the threshold according to the objective of handwritten image detection.

FIG. 11B illustrates the removal processing in the embodiment. The input image data ID2 which undergoes removal processing is the same image data as the input image data ID2 which undergoes removal processing in the comparative example. In the removal processing in the embodiment, the threshold setting section 212 sets the removal threshold (0.9 (90%)) for determining whether or not an image is a handwritten image as a prerequisite for the removal processing (Step S651).

Therefore, the image classifying section 211 determines that an area in which the printed image P2 overlaps with the handwritten image HW2 does not express the handwritten image HW2 but expresses other types of images (overlapping area, printed images and background). The image processor 213 adjusts gradation values such that a portion of the printed image P2 (overlapping portion image HW2c) is not omitted and the color of the pixels not overlapping the pixels expressing the printed image P2 among the pixels expressing the handwritten image HW1 becomes the background color.

Therefore, the image processor 213 does not harm the printed image P2 and can generate output image data ID2a in which the handwritten image HW1 has been removed. However, the removal threshold is a threshold at which the detection sensitivity for handwritten images is decreased and non-detection of a handwritten image is allowed to some extent because the removal threshold is set to a comparatively large value focusing on omission of the printed image.

FIG. 11C illustrates the emphasis processing in the embodiment. The input image data ID2 which undergoes emphasis processing is the same image data as the input image data ID2 which undergoes removal processing in the comparative example. In the removal processing in the embodiment, the threshold setting section 212 sets an emphasis threshold (0.7 (70%)) which is a comparatively small value for determining whether or not an image is a handwritten image as a prerequisite for emphasis processing and increases the detection sensitivity for handwritten images (Step S651).

Therefore, the image classifying section 211 determines that an area in which the printed image P2 and the handwritten image HW2 overlap is not the printed image P2 but expresses a handwritten image HW2a. The image processor 213 includes a portion of the printed image P2 (overlapping portion image HW2c) and adjusts gradation values so as to darken the color of the pixels expressing the handwritten image HW1.

Since the printed image P2 has a darker color in the overlapping portion but is not omitted, influence on the printed image P2 is generally limited. Therefore, the image processor 213 does not obviously harm the printed image P2 but can generate output image data ID2b including a printed image P2a and the handwritten image HW2a in which the handwritten image HW2 has been emphasized while reducing non-detection of the handwritten image HW2.

The removal threshold and the emphasis threshold are adjusted based on a user setting. Specifically, the operation display section 230 describes the tradeoff to the user while receiving user input of a recommended handwritten image detection rate. In this example, it is assumed that the recommended handwritten image detection rate displays 90% as the threshold for removal processing of the handwritten image and displays 70% as the threshold for emphasis processing of the handwritten image.

In Step S670, the image processor 213 outputs output image data ID1a, ID1b, ID2a, and ID2b. In Step S700, the color conversion processor 250 converts colors of the image data ID1a, ID1b, ID2a, and ID2b which is RGB data into cyan, magenta, yellow, and key (CMYK) image data for reproduction in the colors (CMYK) of the coloring material used by the image forming section 220. The CMYK image data is data consisting of each CYMK gradation value (0 to 255).

In Step S800, the image forming section 220 performs halftone processing and generates halftone data of the CMYK image data. In Step S900, the image forming section 220 forms an image on a printing medium based on the halftone data and outputs the printing medium. The printing medium is also referred to as an image formation medium.

As such, the image forming apparatus 10 in the embodiment calculates a classification probability of handwritten images by extracting and classifying handwritten images from an image input by semantic segmentation using a CNN, performs image processing to determine handwritten images with a comparatively great threshold for removal processing and remove the handwritten images, and performs image processing to determine handwritten images with a comparatively small threshold for emphasis processing and emphasize the handwritten images. Therefore, the image forming apparatus 10 can inhibit non-detection of handwritten images in the emphasis processing while effectively inhibiting omission of printed images in the removal processing.

Variations

The present disclosure is not limited to the above embodiment and may also be implemented in the following variations.

Figure 12A:
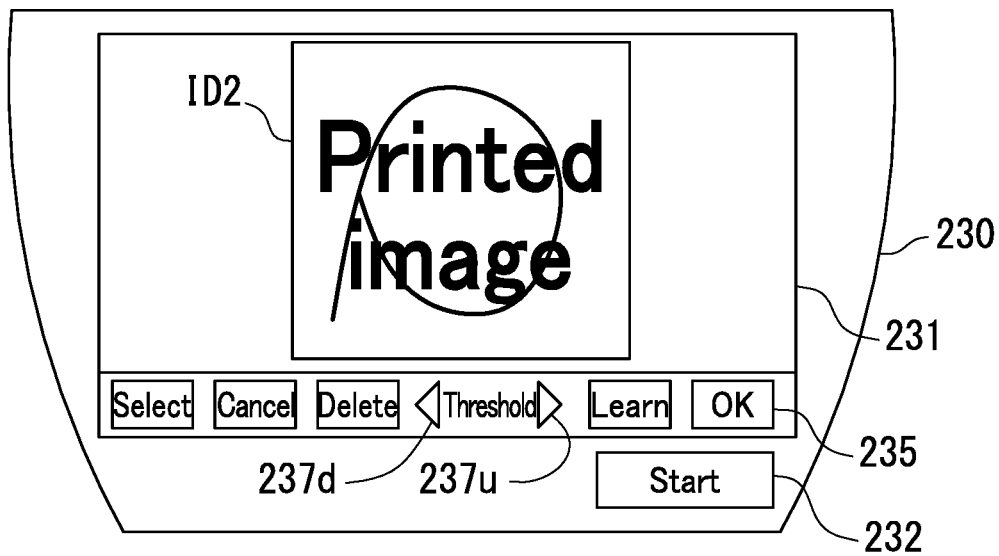
FIGS. 12A and 12B are descriptive diagrams illustrating the content of learning processing according to a variation.
Figure 12B:
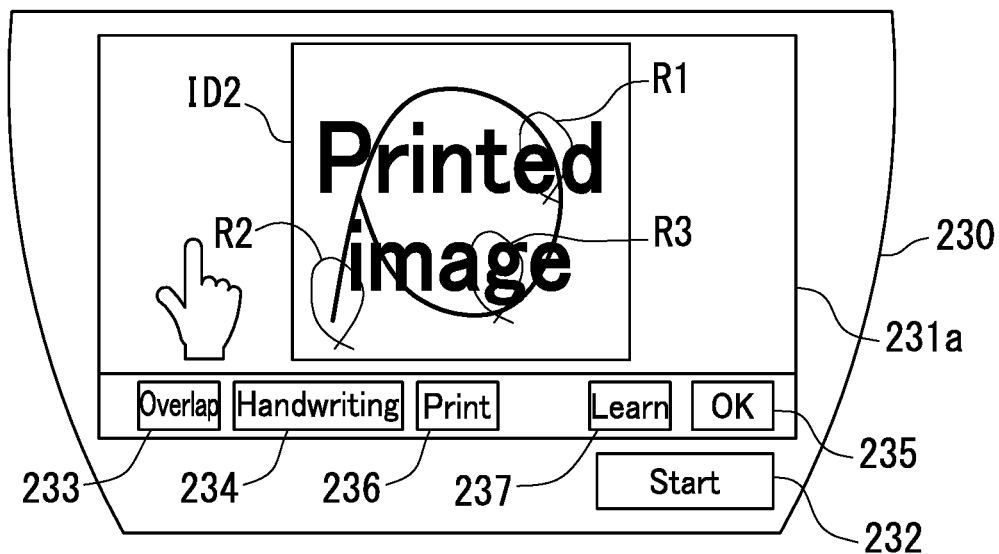

Variation 1: In the above embodiment, the threshold is preset and fixed, but the threshold may be adjusted using the operation display section 230 after classification processing has been completed. The operation display section 230 has a user interface screen 231 (refer to FIG. 12A) and a start button 232. The user interface screen 231 has an interactive processing mode and displays a threshold reduction icon 237d, a threshold increase icon 237u, and an OK icon 235.

In each processing mode of the handwritten image removal processing and the handwritten image emphasis processing, the threshold reduction icon 237d can decrease the threshold according to a user touch and the threshold increase icon 237u can increase the threshold according to the user touch. After the image classification processing has been completed in the above embodiment, the user can adjust the threshold while confirming a change to the image in real time because the handwritten images can be distinguished only by comparing the classification probability to the threshold and distinction may be performed with a small amount of processing.

Variation 2: In the above embodiment, learning is performed in advance by using a handwritten image and a printed image as teacher (training) data, but the present disclosure may be configured as an image forming apparatus which has a learning mode that enables new learning. Specifically, the operation display section 230 displays a user interface screen 231a for learning and can receive user input for learning.

Specifically, the user slides a finger over an input image ID2 displayed on the user interface screen 231a to specify a first area R1 which is an image area including an overlapping portion in which a handwritten image and a printed image overlap and touches an overlap icon 233. Therefore, the image classifying section 211 can input the image of the first area R1 (also referred to as a first teacher image) as supervised learning data in a state where the first area R1 is specified as an image area including a handwritten image, a printed image, and an overlapping image which is an image of an overlapping portion of the handwritten image and the printed image.

Next, the user slides a finger over the input image ID2 displayed on the user interface screen 231a to specify a second area R2 which is an image area including only a handwritten image and touches a handwriting icon 234. Therefore, the image classifying section 211 can input the image of the second area R2 (also referred to as a second teacher image) as supervised learning data in a state where the second area R2 is specified as an image area including only a handwritten image.

In addition, the user slides a finger over the input image ID2 displayed on the user interface screen 231a to specify a third area R3 which is an image area including only a printed image and touches a printing icon 236. Therefore, the image classifying section 211 can input the image of the third area R3 (also referred to as a third teacher image) as supervised learning data in a state where the third area R3 is specified as an image area including only a printed image.

Finally, the user can touch a learning icon 237 to start learning. The learning result is stored in the storage 240 as learning data 241 and can be used in the CNN. The image forming apparatus may be configured to allow the learning mode only in a state where a user is logged into the image forming apparatus, for example. In this case, detection accuracy can be increased by using the writing (features of density or shape of images) of each user.

Variation 3: In the above embodiment, the color of the coloring material of the writing tool used to form the handwritten image is not considered in setting the threshold, but for example in a case where the hue of the coloring material of the printed image clearly differs from the hue of the coloring material of the writing tool, the difference between the removal threshold and the emphasis threshold may be set to be small when the difference between hue angles is large. When the difference between hue angles is large, deterioration of the printed image of the overlapping area is obvious and the classification probability for handwritten images increases.

Variation 4: In the above embodiment, classification (image segmentation) is performed in the RGB color space, but classification may also be performed in the color space of the coloring material (CYMK, for example) of the image forming apparatus 10, for example. As such, the image forming apparatus 10 is notable in that the features of the handwritten image are made clear based on the difference in color properties of the coloring material of the writing tool using the printed image formed with a coloring material with known color properties and the light source 112 with a known spectrum as a reference.

Variation 5: In the above embodiment, the present disclosure is applied to an image forming apparatus, but may also be appropriately applied to an image reading device, for example. The present disclosure may be appropriately applied to an image forming apparatus, an image reading apparatus, or a mobile terminal functioning as an image processing device.

Variation 6: In the above embodiment, examples of the recording medium which stores the image processing program include a hard disk drive and flash memory, but the storage medium may also be another storage medium such as compact disk read-only memory (CD-ROM).

What is claimed is:

1. An image processing device comprising:
an image classifying section configured to, through a convolutional neural network, classify each pixel of input image data as expressing or not expressing a handwritten image to calculate a classification probability of each pixel, the classification probability being a probability that the handwritten image is expressed;
a threshold setting section configured to set a first threshold when removal processing is performed and a second threshold when emphasis processing is performed, the removal processing being image processing to remove the handwritten image, the emphasis processing being image processing to emphasize the handwritten image, the second threshold being smaller than the first threshold; and
an image processor configured to adjust a gradation value of pixels for which the classification probability is no smaller than the first threshold to remove the handwritten image when the removal processing is performed and to adjust the gradation value of pixels for which the classification probability is no smaller than the second threshold to emphasize the handwritten image when the emphasis processing is performed.

2. The image processing device according to claim 1, wherein
the image processing device has a learning mode in which the image classifying section is configured to learn to classify the handwritten image from an image of an overlapping portion in which the handwritten image and a printed image overlap based on a first teacher image which includes the handwritten image, the printed image, and an overlapping image which is the image of the overlapping portion, a second teacher image including only the handwritten image, and a third teacher image including only the printed image.

3. An image forming apparatus comprising:
the image processing device according to claim 1;
an image forming section configured to form an image with a prescribed coloring material on an image formation medium; and
a color conversion processor configured to convert a color space of the input image data into a color space which is reproducible with the prescribed coloring material, wherein
the image classifying section is configured to perform the classification and calculation of the classification probability based on the image data converted into the color space which is reproducible with the prescribed coloring material.

4. An image processing method comprising:
classifying each pixel of input image data as expressing or not expressing a handwritten image to calculate a classification probability of each pixel using a convolutional neural network, the classification probability being a probability that the handwritten image is expressed;
setting a first threshold when removal processing is performed and a second threshold when emphasis processing is performed, the removal processing being image processing to remove the handwritten image, the emphasis processing being image processing to emphasize the handwritten image, the second threshold being smaller than the first threshold; and
adjusting a gradation value of pixels for which the classification probability is no smaller than the first threshold to remove the handwritten image when the removal processing is performed and adjusting the gradation value of pixels for which the classification probability is no smaller than the second threshold to emphasize the handwritten image when the emphasis processing is performed.

5. A non-transitory computer-readable storage medium which stores an image processing program for controlling an image processing device, the image processing program causing the image processing device to function as:
an image classifying section configured to, through a convolutional neural network, classify each pixel of input image data as expressing or not expressing a handwritten image to calculate a classification probability of each pixel, the classification probability being a probability that the handwritten image is expressed;
a threshold setting section configured to set a first threshold when removal processing is performed and a second threshold when emphasis processing is performed, the removal processing being image processing to remove the handwritten image, the emphasis processing being image processing to emphasize the handwritten image, the second threshold being smaller than the first threshold; and
an image processor configured to adjust a gradation value of pixels for which the classification probability is no smaller than the first threshold to remove the handwritten image when the removal processing is performed and to adjust the gradation value of pixels for which the classification probability is no smaller than the second threshold to emphasize the handwritten image when the emphasis processing is performed.

* * * * *